United States Patent Office 3,357,508
Patented Dec. 12, 1967

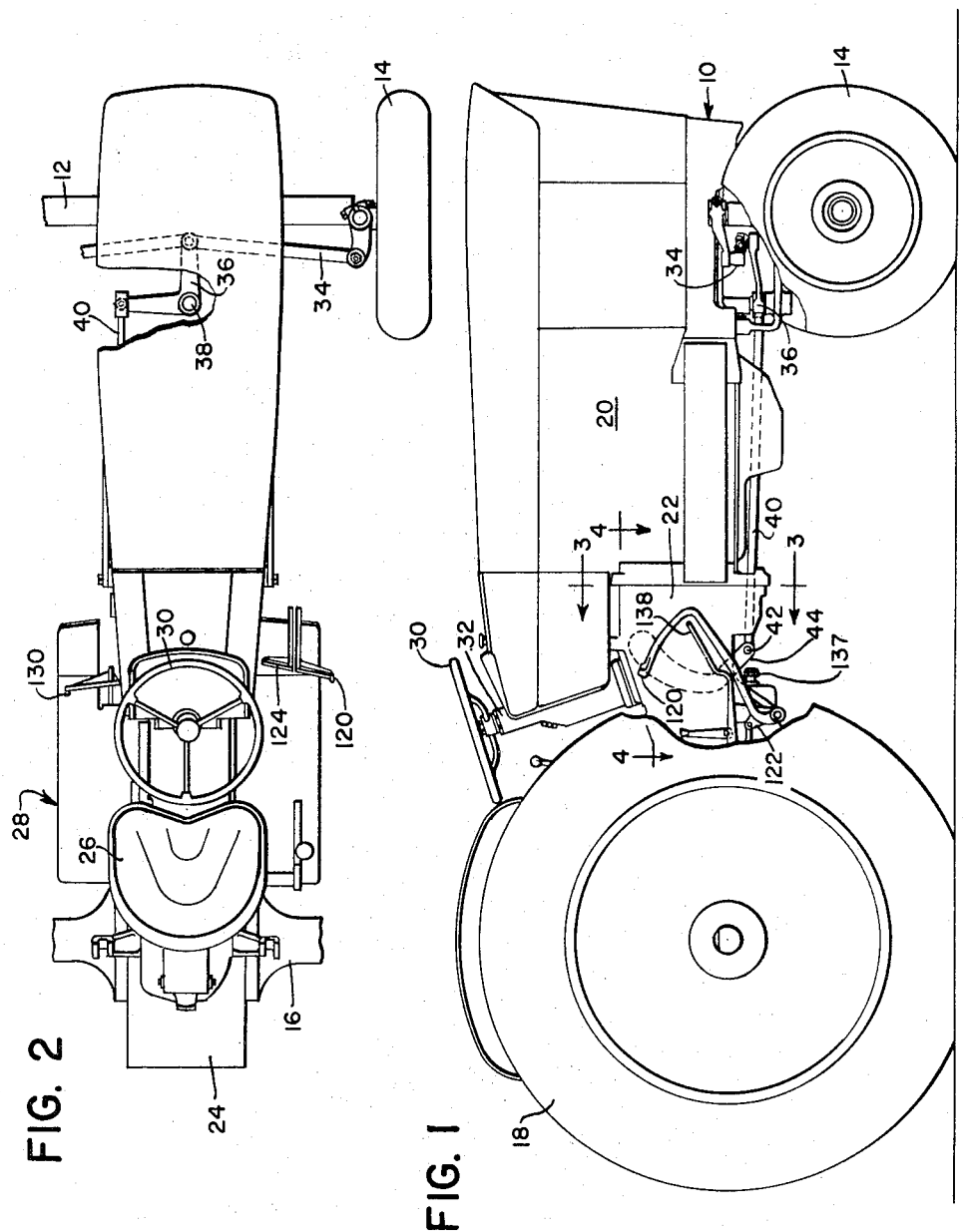

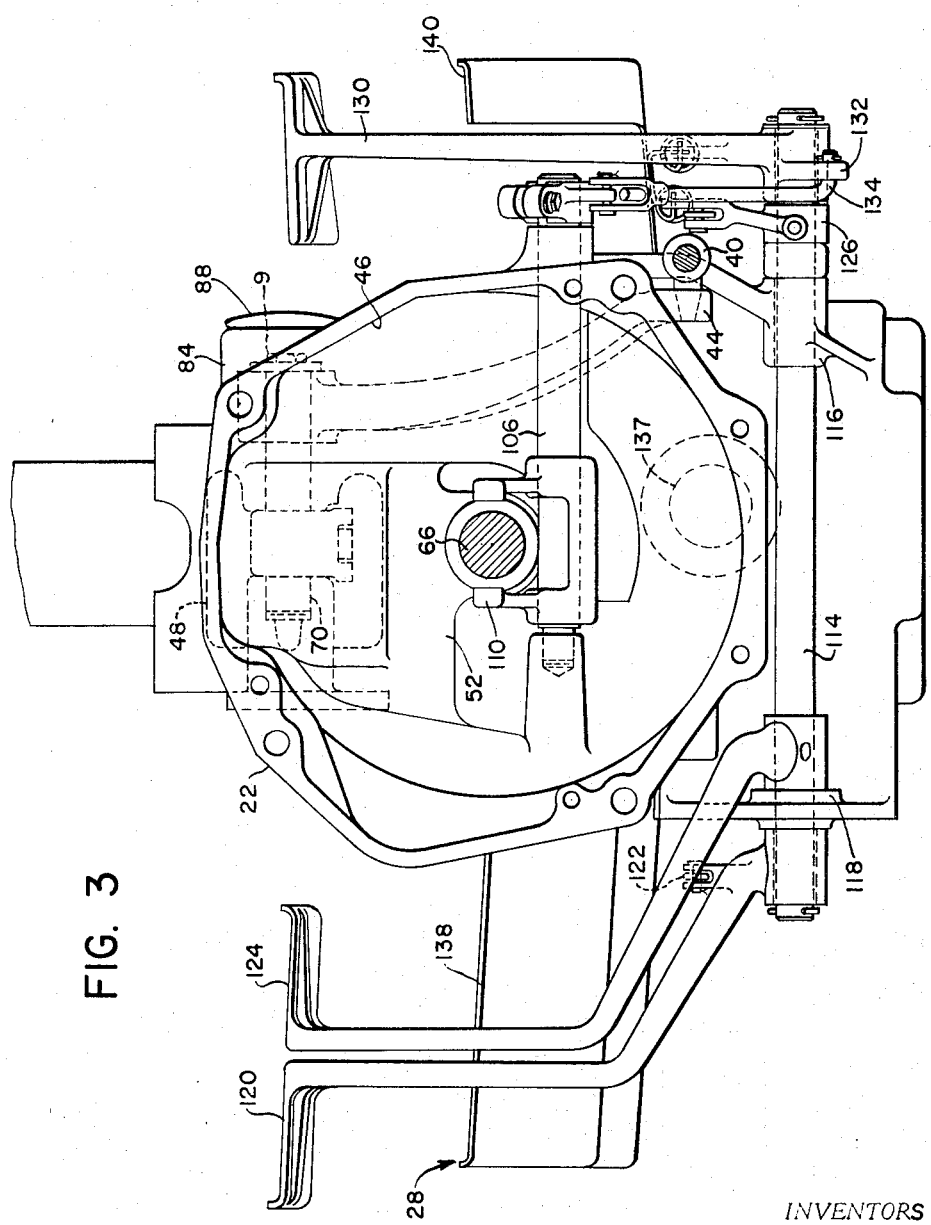

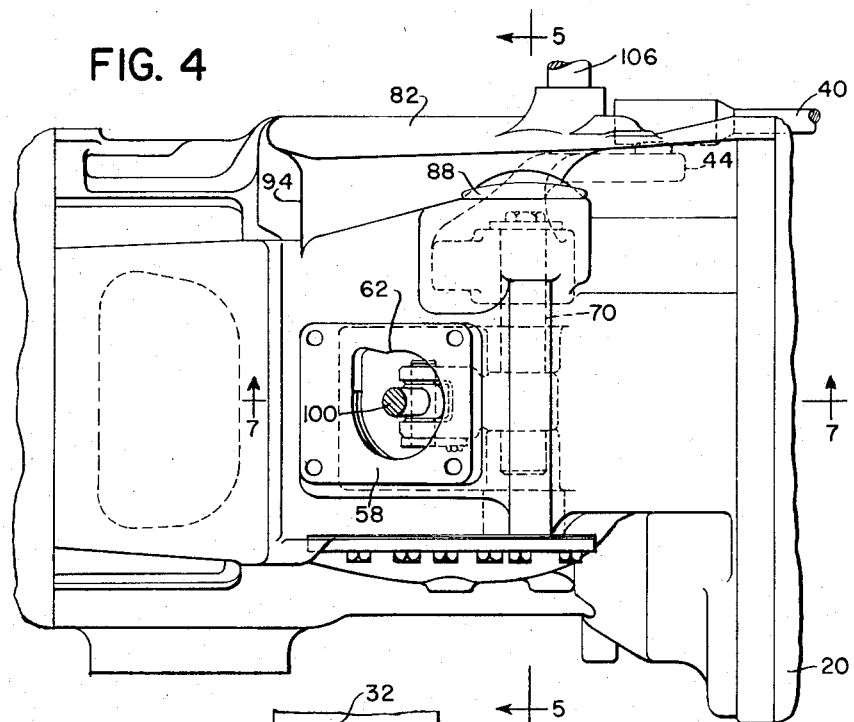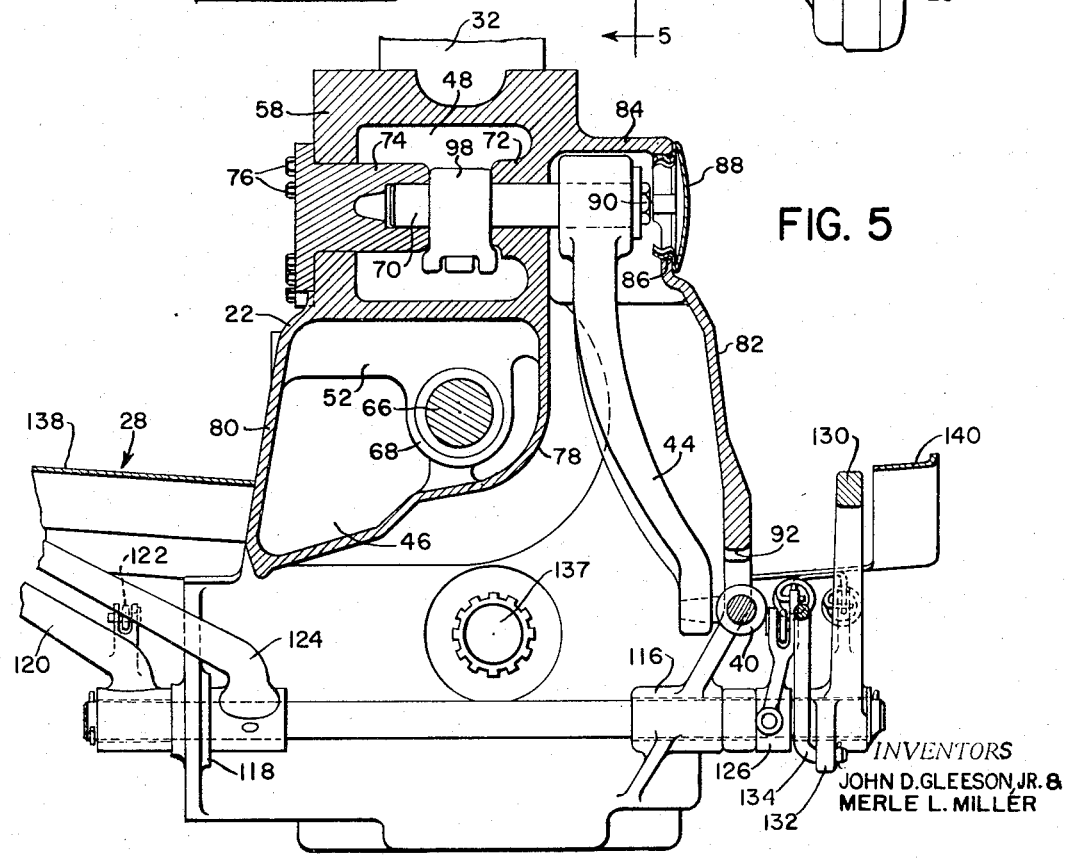

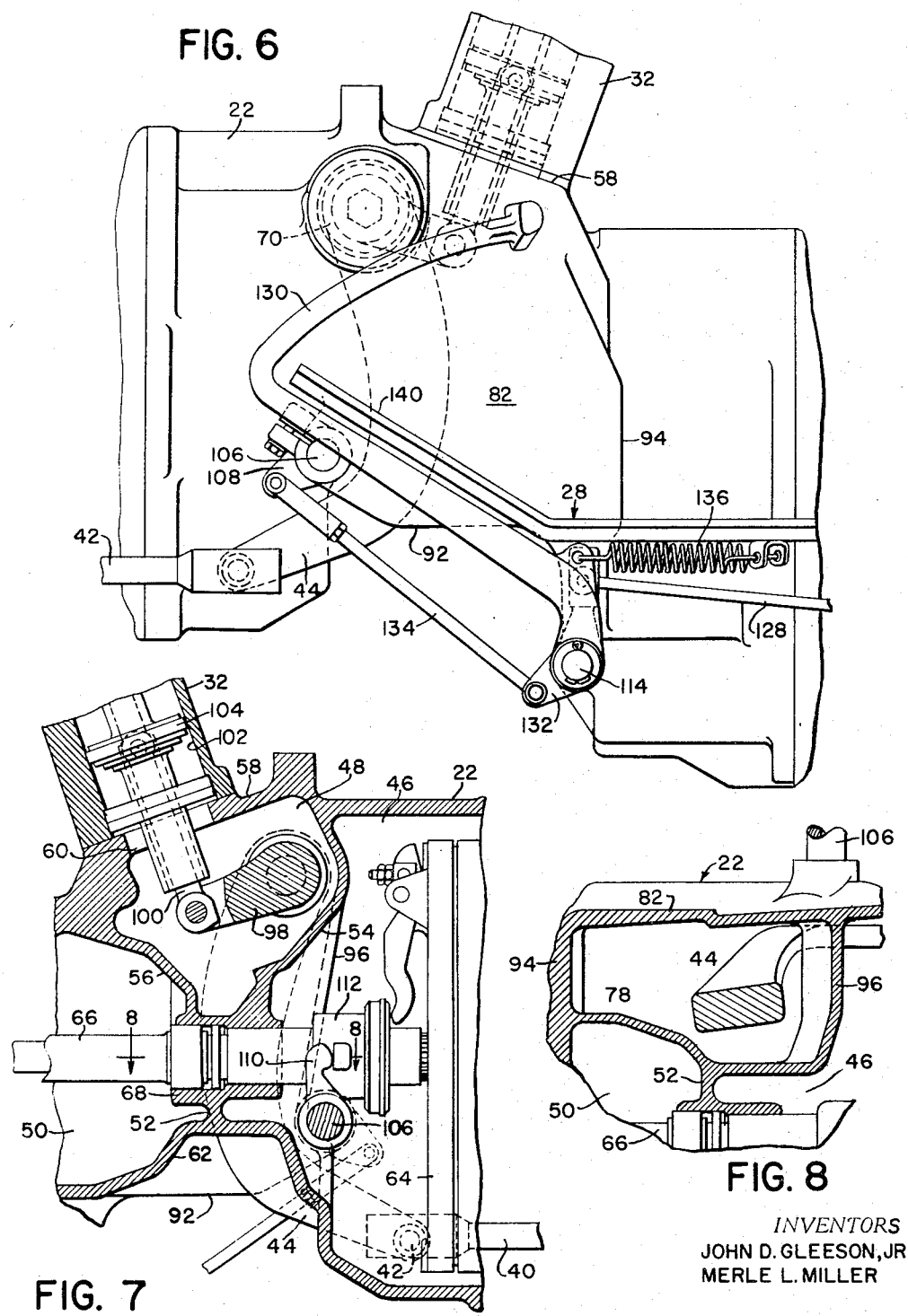

3,357,508
TRACTOR CONSTRUCTION
John Daniel Gleeson, Jr., and Merle Leroy Miller, Waterloo, Iowa, assignors to Deere & Company, Moline, Ill., a corporation of Delaware
Filed Jan. 10, 1966, Ser. No. 519,491
10 Claims. (Cl. 180—6.2)

ABSTRACT OF THE DISCLOSURE

A tractor body structure having a multi-compartment housing containing interior components and external operating means wherein the housing has an outer skirt portion lying between a pair of the operating means.

---

This invention relates to a tractor and more particularly to an improved body construction that simplifies the arrangement and mounting of several components, including the engine clutch, portions of the tractor steering mechanism and related components.

It is known in tractor design to constitute the tractor basically of several end-to-end arranged assemblies, including the engine or power plant, a clutch housing, a transmission housing and the rear axle assemblies. This provides a tractor of the so-called frameless type; that is, no separate side frame members are required. The typical tractor has, of course, a pair of front steerable wheels and various arrangements have been resorted to to interconnect the centrally-mounted steering mechanism to these front wheels. Additional complications arise because of the required arrangement of two brake pedals at one side of the tractor and a clutch pedal at the opposite side. In the most common arrangement, the clutch pedal will occur at the left side of the tractor, as will the steering arm that connects to the steering mechanism drag link. According to the present invention, this arrangement is simplified by improved body structure, and the principal object of the invention lies in these improvements, especially an arrangement in which the left-hand side of the body includes a skirt or wall portion that is disposed between the steering arm and clutch pedal so as to adequately and safely separate the two. Additional objects of the invention reside in improved floor or overhanging foot-board structure that provides additional protection for the operator from moving parts, such as the lower portion of the clutch pedal at one side of the tractor and lower portions of the brake pedals at the opposite side; to provide an improved arrangement of the mounting shaft for the clutch and brake pedals whereby all three may be mounted coaxially and yet used independently.

The foregoing and other important objects will appear as the invention is described in detail.

In the drawings:

FIG. 1 is a side elevational view, with portions broken away, of a representative tractor.

FIG. 2 is a fragmentary plan view, with portions omitted and other portions broken away, of the tractor of FIG. 1.

FIG. 3 is an enlarged view, partly in section, as seen along the line 3—3 of FIG. 1.

FIG. 4 is a fragmentary plan view, partly in section, as seen along the line 4—4 of FIG. 1.

FIG. 5 is a transverse sectional view as seen along the line 5—5 of FIG. 4.

FIG. 6 is a side elevational view, with portions broken away, of the intermediate portion of the tractor as seen from the side opposite to FIG. 1.

FIG. 7 is a fragmentary longitudinal section as seen on the line 7—7 of FIG. 4.

FIG. 8 is a fragmentary sectional view as seen along the line 8—8 of FIG. 7.

The tractor has a longitudinal main body 10 carried on a transverse front axle 12, including a pair of steerable front wheels, only one of which is shown at 14, and on a rear axle assembly 16, which also includes large traction wheels, only one of which appears at 18. The fore part of the body is represented by an internal combustion engine or equivalent power plant 20, an intermediate part of the body includes a housing 22, and the rear portion of the body may be said to be represented by a typical transmission casing 24.

Situated above the rear casing part 24 is an operator's seat 26 at the central rear part of an operator's station or platform designated by the numeral 28. Just ahead of the seat is a steering wheel 30 mounted on a generally upright support 32 and connected, by mechanism to be described later in detail, to the steerable front wheels 14. The steering arms of these wheels are interconnected by a tie rod assembly 34 and this in turn is connected to one arm of a bell crank 36 that is suitably pivoted to a lower front portion of the body 10 as at 38. The other arm of the bell crank is connected to a drag link 40 which extends rearwardly and below a leftward portion of the body to a connection at 42 with a steering arm 44 that is in turn rocked fore and aft by turning of the steering wheel 30.

It is a feature of the invention that the housing 22 is internally compartmented so as to provide first, second and third compartments 46, 48 and 50, respectively. These compartments are afforded by interior wall means including a transverse partition wall 52 which has upwardly diverging wall portions 54 and 56 which ultimately join with a top wall 58 in which a top opening 60 is provided. The partition wall means 52 meets the general bottom wall of the casing (seen at 62) to complete the enclosure.

The compartment 46 contains the clutch means, as at 64, for the power plant and a shaft 66 that extends rearwardly from the clutch means is journaled at 68 in bearing means formed integrally with the partition wall means 52.

The upper intermediate compartment 48 contains a rockable cross shaft 70, mounted as best shown in FIG. 5 by one bearing 72, provided as part of the housing interior wall means, and by a second bearing 74 which is removably inserted through the right-hand wall, being secured normally in place by a plurality of cap screws 76. The housing side wall of which the bearing 72 is a part is the left-hand wall for the compartment 48 as well as a left-hand wall portion for a rear part of the clutch compartment 46, the intermediate configuration being best shown at 78 in FIG. 5 and appearing also in FIG. 8. The cooperating, opposed right-hand wall appears at 80.

The cross shaft 70 has its left-hand or outer end projecting leftwardly beyond the wall 78, at which point it has fixedly secured thereto the upper end of the steering arm 44, from which it follows that rocking of the shaft 70 about its transverse axis causes fore-and-aft rocking of the arm 44 and consequent fore-and-aft shifting of the drag link 40. This arrangement disposes the swingable steering arm 44 at the left-hand side of the tractor, as is generally conventional. But the present invention provides further features with respect to the enclosure—or substantial enclosure of the steering arm. This is accomplished by the inclusion in the intermediate housing 32 of a third side wall 82, spaced leftwardly beyond the wall 78 (FIG. 5) and having an integral top portion 84 merging with the wall structure surrounding the steering mechanism compartment 48. The upper portion of the wall 82 has an opening 86 therein coaxial with the steering shaft 70 and normally closed by a removable plug 88, whereby access may be had to a cap screw 90, for example, removal of which enables removal of the shaft 70 from the right-hand side of the tractor, the bearing insert 74 first being removed.

The wall portion 82 is in the form of a skirt, having a lower marginal edge 92 (FIGS. 5 and 6) which is relatively low and therefore substantially overlies the entire steering arm 44. As best seen in FIG. 6, the wall portion 82 blends at its rear into the proximate side wall of a rearward portion of the housing 22 as at 94. It will be seen in FIGS. 7 and 8 that the side wall 82 has an integral front wall portion 96 which extends inwardly and then rearwardly to merge into or blend with the inner left-hand side wall 78 in the area of the transverse partition 52. There is thus provided for the steering arm 44 an exterior compartment open only at its bottom so as to allow the steering arm to project downwardly therethrough. In FIGS. 1 and 2, the steering arm 44 is shown in a central position; that is, with the front wheels straight ahead. In the other views, the arm has been swung to its maximum forward position, mainly to illustrate the function of its particular shape and its relationship to other components to be described later. The maximum fore-and-aft range of the arm 44 is best depicted in FIG. 8.

The cross shaft 70 has rigidly affixed thereto within the steering mechanism compartment 48 a rearwardly extending arm 98 which is connected at its rear end to a steering member. In the present case, this member takes the form of a piston rod 100 of a power steering assembly housed mainly in the steering support 32, the interior of which affords a cylinder 102 within which is reciprocatable a piston 104 to which the piston rod 100 is connected. Any suitable form of hydraulic power steering means may be utilized. Also, the hydraulic means may be interchangeable with any suitable mechanical means, the details of which form no part of the present invention. The steering support is secured to the upper wall 58 of the housing 22 in any suitable manner, as by a plurality of cap screws (not shown).

The clutch means 64 is controlled by mechanism including a first or forwardly mounted rockshaft 106, journaled appropriately in the housing 22 and extending from within the compartment 46 to without the compartment, having at its outer end a short arm 108. The manner of the mounting of the rockshaft 106 is best seen in FIG. 3, wherein there also appears (see also FIG. 7) a throw-out yoke 110 in association with a throw-out bearing 112 for the clutch means 64.

A second and rearwardly mounted rockshaft 114 is located below an intermediate portion of the housing 22, being supported at opposite sides respectively by bearings 116 and 118 (FIG. 5). This rockshaft extends rightwardly and has loosely rockably mounted thereon a right-hand brake pedal 120, which is of conventional L shape and which may be further connected in any suitable manner, as indicated at 122, to brake means for the right-hand wheel 18. Just inwardly of the right-hand bearing 118, the rockshaft 114 has rigidly fixed thereto a left-hand brake pedal 124, having generally the same configuration as the other pedal 120 and lying closely therealongside, as is typical.

The rockshaft 114 projects to the left beyond the left-hand bearing 116 and has rigidly affixed thereto a short arm 126 which is suitably connected, as at 128, to brake means for the left-hand tractor wheel, thus giving the tractor, typically, independent brakes for the two rear wheels. Since the brake pedal 120 is loosely mounted on the rockshaft 114, and since the other brake pedal 124 is fixedly mounted on this shaft, the two pedals may be operated independently. The foot-receiving surfaces of the pedals are conventionally closely related so that the operator may, with one foot, depress both pedals simultaneously. The brake means may be mechanical or hydraulic, these details being presently of little importance so far as concerns the invention.

The rockshaft 114 serves a further purpose in that it mounts a clutch pedal 130 at the left-hand side of the tractor. The transverse extent of the rockshaft 114 is such that the clutch pedal 130 is located laterally outwardly or leftwardly beyond the protecting casing wall 82. In other words, the wall 82 intervenes between the steering arm 44 and the clutch pedal 130. This is important from the standpoint of divorcing these two from each other so that there will be no conflict in their motion and no possibility of the operator having his left foot inadvertently engaged—and perhaps damaged—by the steering arm 44. The lower rear end of the pedal 130 is loosely mounted on the rockshaft 114 so that it is movable independently of the brake pedals and has as a rigid part thereof a downwardly and forwardly projecting arm 132 which is operatively connected by a link 134 to the previously described outer arm 108 on the throw-out rockshaft 106. The pedal 130 is biased to its clutch-disengaged position as by a tension spring 136.

Projecting forwardly from a dependent portion of the casing 32 is a forward power take-off shaft 137 (FIGS. 1, 3 and 5).

The operator's platform or station includes right- and left-hand portions 138 and 140, respectively, which form additional measures of safety and comfort for the operator. The right-hand portion 138 overlies the lower rearward portions of the brake pedals 120 and 124 and the left-hand portion 140 occupies the same relationship to the clutch pedal 130. As best seen in FIG. 6, the link 134 between the two rockshafts 106 and 114 lies below the clutch pedal and consequently below the left-hand portion 140 of the operator's station 28. The clutch return spring 136, as well as the connection from the rockshaft to the left-hand brake means 128 also lies below a rearward extension of the portion 140. The same relationship is involved at the opposite side of the tractor relative to a rear extension of the portion 138 and the right-hand brake connecting means 122.

The over-all arrangement is one of compactness and simplicity. The steering arm 44 is separated from the clutch pedal 130 by the intervening housing wall 82, and the arm 144 operates in its own compartment separate from the inner compartments that contain the steering mechanism, clutch means and rearward extending portion of the shaft 66. The clutch and brake pedals are mounted on a common cross shaft and these are all arranged in a convenient manner, from the standpoint of design and assembly as well as from the standpoint of operator convenience.

A further advantage of the construction is that the tractor has relatively high ground clearance, yet the steering gear housing is not so high as to require an unduly long steering arm. That is to say, the incorporation of the steering gear housing into the clutch housing places it at a lower level and enables the use of a short steering arm. Moreover, this arrangement keeps the steering wheel on the centerline of the tractor and the steering arm, being closely along one side of the tractor, permits the drag link to lie closely alongside the engine rather than below it.

Features and objects in addition to those described in detail will readily occur to those versed in the art.

What is claimed is:

1. A tractor having a fore-and-aft extending body including a power plant clutch, a housing enclosing the clutch and including opposite side walls, clutch operating means carried by the body and including a fore-and-aft movable member spaced laterally outwardly of and movable alongside one of the side walls, and steering mechanism carried by the body and including a fore-and-aft movable steering arm external to the housing and disposed generally alongside said member and intermediate said member and said one wall and a cross shaft connected to said arm and extending into the housing, the improvement comprising further wall means rigid with the housing and including a generally upright fore-and-aft portion laterally intervening between the member and the arm and protectively separating the two from each other.

2. The invention defined in claim 1, in which the steering arm depends from the cross shaft and the further wall means includes portions enclosing the arm from above, ahead and behind to combine with said one side wall for providing an open-bottom compartment for said arm.

3. The invention defined in claim 1, including partition means within and dividing the housing into first and second compartments respectively for the clutch and that portion of the cross shaft that is interiorly of the housing.

4. The invention defined in claim 3, in which the clutch includes a longitudinal shaft offset below the cross shaft and the partition means includes a bottom wall for the second compartment and a bearing portion below said bottom wall and journaling said longitudinal shaft.

5. The invention defined in claim 4, in which the partition means includes a transverse portion depending from said bottom wall and providing in said housing a third compartment separate from said first and second compartments, and said transverse portion carries said bearing portion and the clutch shaft extends through said bearing portion and into said third compartment.

6. The invention defined in claim 1, in which the cross shaft is offset upwardly and rearwardly from the clutch, the aforesaid movable member includes a body-carried first transverse rockshaft offset rearwardly of and at a level below that of the cross shaft, a housing-carried second transverse rockshaft is disposed adjacent to the clutch and at a level below that of the cross shaft, fore-and-aft linkage is disposed outwardly beyond said further wall means and operatively interconnects the two rockshafts, and the body carries a laterally outwardly projecting element overlying said linkage.

7. The invention defined in claim 6, in which the first rockshaft extends across the body, having one end portion on which the clutch operating member is journaled and an opposite end portion laterally beyond the other side wall, and a pair of brake operating members is mounted on said opposite end portion.

8. The invention defined in claim 7, in which the tractor includes brake means respectively at opposite sides of the body, one brake operating member is journaled on said first rockshaft and is operatively connected to the brake means at that side of the body, the other brake member is fixed to said first rockshaft, and brake operating means is connected to the other brake means laterally outwardly of said further wall means and includes a member rigid on said first rockshaft adjacent to the clutch operating member.

9. The invention defined in claim 1, in which the housing includes a top wall having an opening leading to that portion of the cross shaft that lies within the housing, a steering support is carried by said top wall over said top opening and includes a steering element entering said opening and operatively connected to the cross shaft.

10. The invention defined in claim 9, in which said support includes a cylinder and the steering element includes a piston in said cylinder.

References Cited

UNITED STATES PATENTS

| 1,455,394 | 5/1923 | Dunham | 180—77 |
| 2,418,048 | 3/1947 | Parrett | 180—6.26 |
| 3,251,429 | 5/1966 | Harms | 180—6.2 |

FOREIGN PATENTS

| 1,005,927 | 9/1965 | Great Britain. |

LEO FRIAGLIA, *Primary Examiner.*

BENJAMIN HERSH, *Examiner.*

J. A. PEKAR, *Assistant Examiner.*